June 3, 1958  R. ACKERT ET AL  2,837,210

OSCILLATING SIEVES, SCREENS OR THE LIKE

Filed May 20, 1955

INVENTORS
RUDOLF ACKERT,
KARL KLAEB
BY
AGENT

United States Patent Office 2,837,210
Patented June 3, 1958

2,837,210

OSCILLATING SIEVES, SCREENS OR THE LIKE

Rudolf Ackert, Salzgitter-Steterburg, and Karl Klaeb, Salzgitter-Lebenstedt, Germany Application May 20, 1955, Serial No. 509,927
In Germany June 27, 1949

Public Law 619, August 23, 1954
Patent expires June 27, 1969

3 Claims. (Cl. 209—400)

This invention concerns oscillating sieves, screens and the like.

For the separation of small sized mixed material from coal, coke, ores and other damp, sticky materials oscillating sieves with long meshes are generally used. The screen covering consists in most cases of steel wires which are spaced from each other and stretched parallel to each other over the screen in its longitudinal direction and are so fastened at several transverse stations arranged over the length of the screen that the distance between the separate wires, also when the screen is fully loaded, is kept practically constant.

When separating dry materials the screen mentioned works well enough from a technical point of view and also gives a very large output. If, however, it is used for a damp screening material as for instance wet coke grit or fine ore the slits in the screen quickly become choked so that only an imperfect separation of the material is obtained.

The object of the present invention is to provide an oscillating screen with long meshes which no longer shows these faults of known screens.

According to the present invention there is provided an oscillating screen with long meshes for the separation of material, particularly material which is damp, sticky, or which tends to agglomerate, comprising a series of separate elastic elements stretched parallel to and at a distance apart from one another in the longitudinal direction of the screen which elements are guided and supported at definite points along their lengths by transverse cross bridges, and in which the elastic elements consist of rubber cords.

It has been found preferable to use a cord having a part round or part square cross-section tapering downwards in the manner of a trapezium.

The cross bridges may also be made of rubber or a rubber covered material.

The invention will be described further, by way of example, with reference to the accompanying drawings in which.

Figure 1:
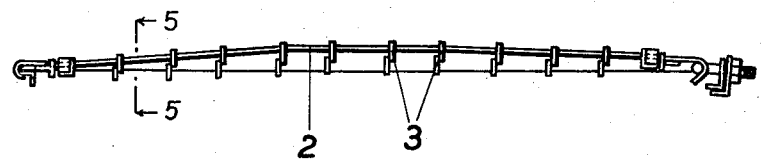
Fig. 1 is an elevational side view of a screen according to the invention.
Figures 2, 5:
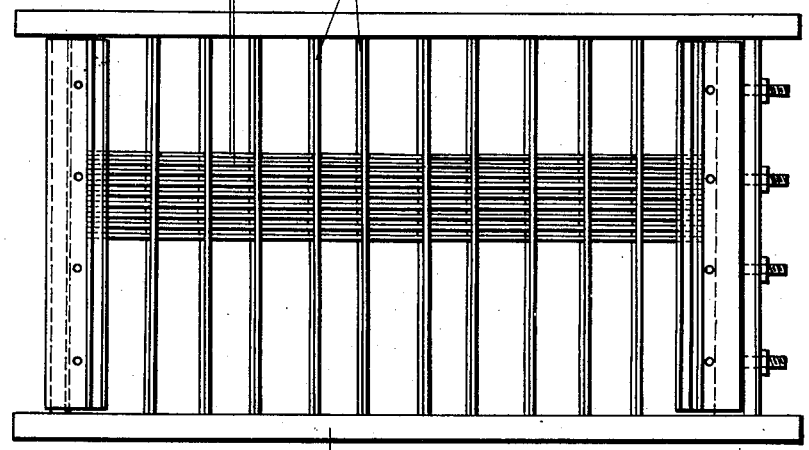
Fig. 2 is a plan view of the screen of Fig. 1.
Fig. 5 is a cross-sectional view of an individual cord taken on the line 5—5 of Figure 1.
Figure 3:
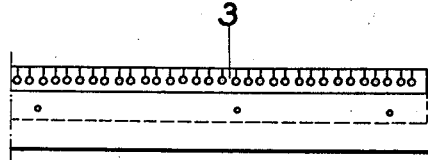
Fig. 3 is a detail view of part of a cross bridge.
Figure 4:
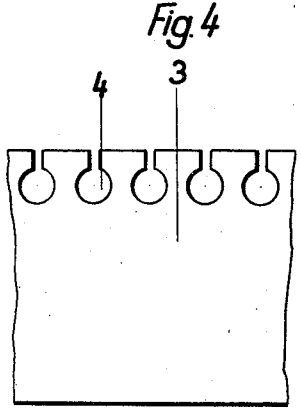
Fig. 4 shows in enlarged scale a cutting out of a cross bridge.

A sieve comprises a frame designated by the numeral 1, individual rubber sieve elements 2 and cross bridges 3.

The cross bridges 3 each have, near their upper edge, round apertures or holes 4 connected to the edge by slits corresponding to the thickness of the separate elements 2 to be stretched across the sieve frame so that these can be easily inserted and again removed. As a result of the elastic and resilient attachment of the stretched elements 2 in the cross bridges 3 the former can also oscillate in the places of attachment, if only to a small degree. The separating effect of the screen is thereby considerably improved.

On a test screen with a mesh width of 3 mm. with elastic elements of 8 mm. diameter, damp coke grit was, during a working period lasting several weeks, faultlessly separated without the least delay or interruption due to choking of the screen. While a screen surface of steel wire, especially with coke grit, will very soon become choked, no sign of choking or other damage showed on the elastic elements of rubber.

What we claim is:

1. An oscillating split screen for separating small sized, damp and sticky particles, such as coal, coke, and ores, from one another, said screen comprising, in combination, a frame, a plurality of rubber strips arranged in said frame substantially parallel with one another, and a plurality of cross bridges arranged in said frame at a distance from one another, each of said cross bridges being provided at one edge thereof with apertures for said rubber strips.

2. An oscillating split screen as claimed in claim 1, in which said cross bridges are resilient.

3. An oscillating split screen as claimed in claim 1, in which said rubber strips have a cross-section which tapers downwards trapezoidally.

References Cited in the file of this patent

UNITED STATES PATENTS

| 530,086 | Butler | Dec. 4, 1894 |
| 2,172,551 | Symons | Sept. 12, 1939 |
| 2,314,880 | Heller | Mar. 30, 1943 |

FOREIGN PATENTS

| 550,582 | Great Britain | Jan. 14, 1943 |
| 360,531 | Italy | June 24, 1938 |